US008855545B2

(12) United States Patent
Wallace (10) Patent No.: US 8,855,545 B2
(45) Date of Patent: Oct. 7, 2014

(54) METHOD AND SYSTEM FOR DELIVERING VISUAL AND AUDITORY CONTENT

(75) Inventor: Michael W. Wallace, Vancouver, WA (US)

(73) Assignee: Pure Imagination, LLC, Vancouver, WA (US)

( * ) Notice: Subject to any disclaimer, the term of this patent is extended or adjusted under 35 U.S.C. 154(b) by 1583 days.

(21) Appl. No.: 12/260,796

(22) Filed: Oct. 29, 2008

(65) Prior Publication Data

US 2009/0123900 A1 May 14, 2009

Related U.S. Application Data

(60) Provisional application No. 61/002,549, filed on Nov. 8, 2007.

(51) Int. Cl.
*G09B 5/00* (2006.01)
*G09B 5/06* (2006.01)

(52) U.S. Cl.
CPC ..................................... *G09B 5/062* (2013.01)
USPC .......................................... 434/317; 434/350

(58) Field of Classification Search
USPC .......................................... 434/308, 317, 319
See application file for complete search history.

(56) References Cited

U.S. PATENT DOCUMENTS

| | | | | |
|---|---|---|---|---|
| 4,557,694 A * | 12/1985 | Nelson | ........................... | 434/339 |
| 5,413,486 A * | 5/1995 | Burrows et al. | ................ | 434/317 |
| 5,417,575 A * | 5/1995 | McTaggart | ..................... | 434/317 |
| 5,466,158 A * | 11/1995 | Smith, III | ...................... | 434/317 |
| 5,474,457 A * | 12/1995 | Bromley | ........................ | 434/311 |
| 6,064,855 A * | 5/2000 | Ho | ................................. | 434/317 |
| 6,915,103 B2 * | 7/2005 | Blume | ........................... | 434/317 |
| 7,099,019 B2 * | 8/2006 | Silverbrook et al. | ........... | 358/1.1 |
| 7,201,317 B2 * | 4/2007 | Song | .............................. | 235/449 |
| 7,203,455 B2 * | 4/2007 | Ernst et al. | ...................... | 434/317 |
| 7,402,042 B2 * | 7/2008 | Kelley et al. | ................... | 434/178 |
| 7,540,406 B2 * | 6/2009 | Song | .............................. | 235/375 |
| 2002/0029146 A1 * | 3/2002 | Nir | ................................ | 704/260 |
| 2003/0152293 A1 * | 8/2003 | Bresler et al. | .................. | 382/305 |
| 2005/0266386 A1 * | 12/2005 | Marggraff et al. | ............. | 434/317 |
| 2008/0133754 A1 * | 6/2008 | Smyth et al. | ................... | 709/226 |

* cited by examiner

*Primary Examiner* — Robert J Utama
*Assistant Examiner* — Sadaruz Zaman
(74) *Attorney, Agent, or Firm* — Rylander & Associates, PC; Philip R. M. Hunt (57) ABSTRACT

A self-contained system containing a plurality of pages of printed content, incorporating means for detecting which page is being viewed by the reader, and incorporating means for producing supplementary auditory output related to the printed content of the pages, wherein the supplementary auditory content produced for any given page is determined by the sequence of pages previously viewed by the reader.

4 Claims, 6 Drawing Sheets

2
This is Lucky.

He's a very happy dog.

600         610

3

4
Meet Cindy.

She loves all kinds of animals.

620         630

METHOD AND SYSTEM FOR DELIVERING VISUAL AND AUDITORY CONTENT

CROSS-REFERENCE TO RELATED APPLICATIONS

This application is a nonprovisional patent application claiming priority to co-pending Provisional Application Ser. No. 61/002,549, filed 8 Nov. 2007, and which is herein incorporated by reference.

FIELD OF THE INVENTION

The present invention relates to methods and systems for delivering visual and auditory content.

BACKGROUND

This invention relates generally to talking books having entertainment and educational value, and more particularly to an interactive talking book system which produces auditory content based on the identity of the page of the book open to the reader.

Story telling must surely be one of the oldest forms of art. Story telling perpetuates cultural memory, educates the listener, promulgates shared ethics and morality, and entertains. Oral presentation of wisdom, story and myth encapsulated and preserved some of the oldest elements of knowledge and understanding that separated humans from animals. Classic texts from Greek times embody those traditions in written form.

However rich and colorful the written forms that stories take, the printed word cannot provide the wealth and diversity of knowledge and entertainment that a human story teller can convey. By shaping the telling of a story to the background and understanding of the audience, and weaving the narrative around the reactions and responses of the listeners, the skilled narrator can provide a greatly enriched and captivating experience.

In recent decades, technology has provided tools to convey richer and more varied types of content beyond mere printed text, including for example full-color still images, audio, and motion video. Various attempts have been made to use such technologies to enhance story telling. For example, Freeman U.S. Pat. No. 5,340,317 describes a system that uses multiple prerecorded tracks of audio and a selection mechanism by use of which a listener can, at certain points in the narrative flow, select from among alternative audio content. Shiels et al. U.S. Pat. Nos. 5,751,953 and 5,754,770 describe a system for presenting audio-video content wherein the viewer periodically interacts with the system to select an option in the branching narrative, or to effect an action to store some information about the narrative, said interactions influencing the selection of which of multiple stored elements of content is displayed as the narrative progresses.

A weakness of each of these systems is that the main flow of the narrative is necessarily determined in advance, and the content or plot of the story unfolds in a basically linear fashion, albeit with optional branches that provide supplementary or alternative content. On the other hand, a book by its nature allows the reader freedom to explore the content in various ways. The reader can proceed from first page to last with pause, or can skip ahead to skim for information about the plot resolution, or return to earlier material to reread and reconsider the significance of an earlier plot point or narrative detail. Accordingly, accessing a story in book form has certain advantages over other forms of multimedia presentation.

Accordingly, inventors have developed methods and systems for augmenting the content of conventional books.

Pierce et al. U.S. Pat. No. 5,356,296 describes a storybook that uses a sound synthesizer associated with a book to progressively reveal auditory information that supplements the text and imagery in the book. Billings U.S. Pat. No. 5,404,444 describes a book system configured such that the reader can select a story element depicted on a page, and a character from the plot, and in response to the selection the book system provides auditory messages that relate to the story element and the character. Rehkemper et al. U.S. Pat. No. 6,525,706 discloses a book incorporating an electronic display upon which still and/or moving imagery is portrayed, along with optional audio content, when the reader depresses a button to signal which page is being viewed. Blotky et al. U.S. Pat. No. 6,788,283 describes a similar system which utilizes a sensor to automatically detect which page is being viewed and provides supplementary material.

None of the systems described in the prior art provides for flexible access to the primary printed content of a narrative, while providing supplementary material selectively relevant to particular portions of the narrative and responsive to the sequence of actions made by the reader.

SUMMARY OF THE INVENTION

One aspect of the present invention is a system that provides flexible access to primary printed content, and provides supplementary content related to the printed content, wherein a plurality of segments of supplementary content is available for at least one of a plurality of pages of printed content, such that the choice of which segment of supplementary content is produced for each of a plurality of pages is controlled at least in part by the prior sequence of pages viewed by the reader.

Another aspect of the present invention is a system that provides flexible access to primary printed content, and provides supplementary content related to the content of a plurality of pages, with a plurality of segments of supplementary content available for at least one of the plurality of pages, and incorporating page sensing means to automatically determine the identity of the current page being viewed by the reader, such that the choice of which one of the plurality of segments of supplementary content is produced for the at least one of a plurality of pages is controlled at least in part by the automatic determination of the sequence of pages viewed by the reader.

Another aspect of the present invention is a system that provides flexible access to primary printed content, and provides supplementary content related to the content of a plurality of pages, with a plurality of segments of supplementary content available for at least one of the plurality of pages, incorporating touch sensing means to detect the reader's interaction with specific regions of at least one of the plurality of pages, such that the choice of which segment of supplementary content is produced for the at least one of the plurality of pages is controlled at least in part by the prior sequence of pages viewed by the reader and by the sequence of specific regions touched by the reader.

Another aspect of the present invention is a system that provides flexible access to primary printed content, and provides supplementary content related to the content of a plurality of pages, with a plurality of segments of supplementary content available for the at least one of the plurality of pages, incorporating page sensing means to automatically determine the identity of the current page being viewed by the reader, and incorporating touch sensing means to detect the reader's interaction with specific regions of at least one of the plurality of pages, such that the choice of which segment of supplementary content is produced for the at least one of a plurality of pages is controlled by the automatic determination of the sequence of pages viewed by the reader and the sequence of specific regions touched by the reader.

BRIEF DESCRIPTION OF THE DRAWINGS

The foregoing summary, as well as the following detailed description of preferred and alternative embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DESCRIPTION OF INVENTION

Figure 1:
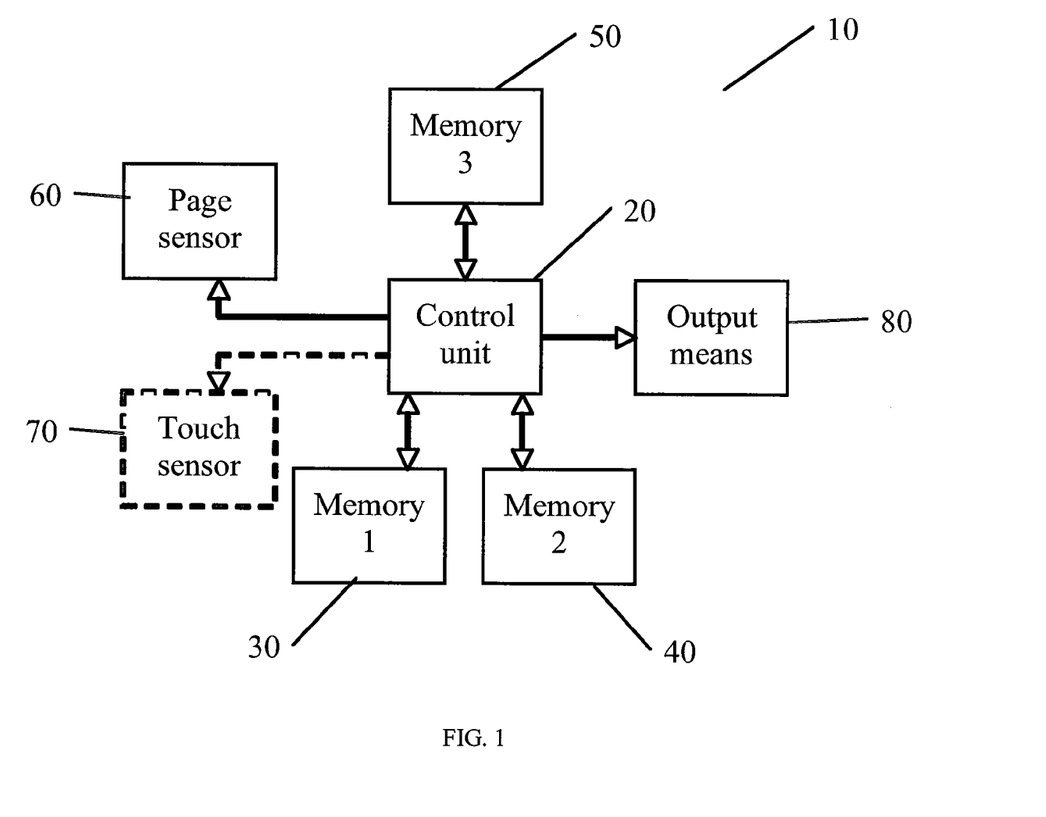
FIG. 1 depicts the component parts of a system according to the present invention.

FIG. 1 shows in summary form the component parts of a system 10 that provides supplementary content related to the printed content of a plurality of pages. A control unit 20 manages the overall function of the system. A first memory 30 contains a plurality of segments of supplementary content related to the printed content of at least one of the plurality of pages A second memory 40 is configured to store the sequence of pages touched by the user, and optionally for each such page in the sequence of pages to store the sequence and identity of the locations touched by the user on the page. A third memory 50 contains program instructions that are executed by control unit 20 in the course of executing the functions of the system described herein. A page sensor 60 is configured to detect which of the plurality of pages of printed content is being viewed by the user of the system. An optional touch sensor 70 is configured to detect which of a plurality of positions on the page currently being viewed is touched by the user of the system. Output means 80 is configured to reproduce the supplementary content selected from the first memory 30 by the control unit 20. The choice of which of a plurality of segments of supplementary content is selected is based on the stored record of the sequence of pages and positions contained within a second memory 40.

In the preferred embodiment control unit 20 is a conventional embedded processor chip. Control unit 20 could also be a standard microprocessor chip, an application-specific integrated circuit, or other embodiments obvious to those skilled in the art. In the preferred embodiment first memory 30 is a read-only memory, second memory 40 is a random-access read/write memory, and third memory 50 is a read-only memory. As will be obvious to those skilled in the art, first memory 30 and third memory 50 may be realized in the same physical memory, and one or both of first memory 30 and third memory 50 may be realized in the same physical package as control unit 20, for example as ROM memory in a conventional embedded processor chip. Furthermore, second memory 40 could be realized as an RAM memory of the SRAM or DRAM variety, and could be realized in the same physical package as control unit 20. Alternatively, second memory 40 could be realized as a flash memory, or by other means. All of these variations are familiar to those skilled in the art and fall within the spirit and scope of this description.

In the preferred embodiment of the present invention, system 10 is embodied within a book system. It is known in the art to produce a book system containing a plurality of pages and incorporating page sensor means and touch sensor means, said system being capable of producing supplementary auditory content related to the printed content of the pages of the book. Cummings U.S. Pat. No. 4,990,092 describes a book system utilizing switches which are pressed by the reader to signal which page is currently being viewed. Haas et al. U.S. Pat. No. 5,707,240 describe a book system utilizing permanent magnets and magnetic sensors to automatically determine which page is being viewed by the reader. Kelley et al. U.S. Patent Application 2004/0043365 describe a book system incorporating page detection means and position detection means to produce a signal indicative of the page being viewed by the reader and the position within the page being touched by the reader. Smith U.S. Pat. No. 5,466,158 teaches the method of producing supplementary audio content in a book system based on the position within the page being touched by the reader.

Figure 2:
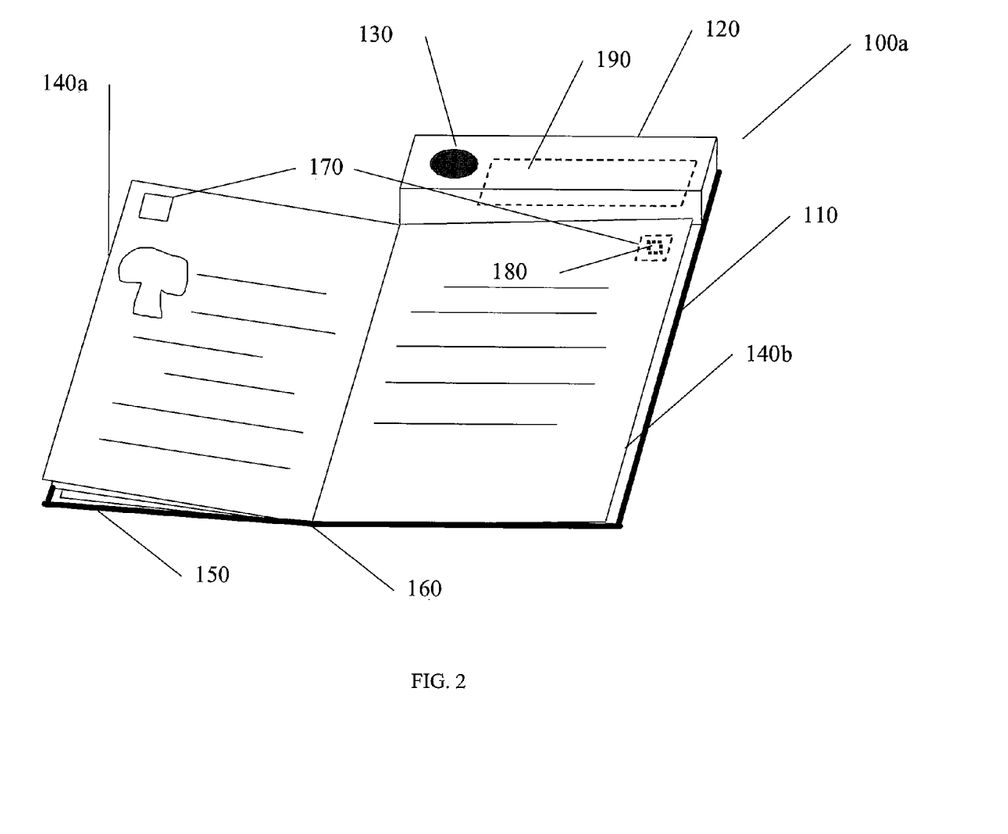
FIG. 2 depicts a exemplary book system constructed according to the present invention.

Accordingly, FIG. 2 depicts an exemplary embodiment of the present invention. Book system 100a incorporates a back cover 110 onto which is mounted a housing 120 containing an audio speaker 130 capable of producing audio sounds under the control of control unit 190. The book system 100 incorporates a plurality of pages 140a, 140b and a front cover 150 bound to back cover 110 at binding 160. In the preferred embodiment binding 160 is a sewn binding, but other binding methods fall within the scope and spirit of this description, including for example ring binding and glued binding. At least one of pages 140a, 140b contains printed content. Magnetic sensor 180 attached to back cover 110 responds to each of a plurality of magnets 170 attached to pages 140a, 140b and front cover 150, thereby detecting which of pages 140a, 140b is currently being viewed by the reader.

Figure 3:
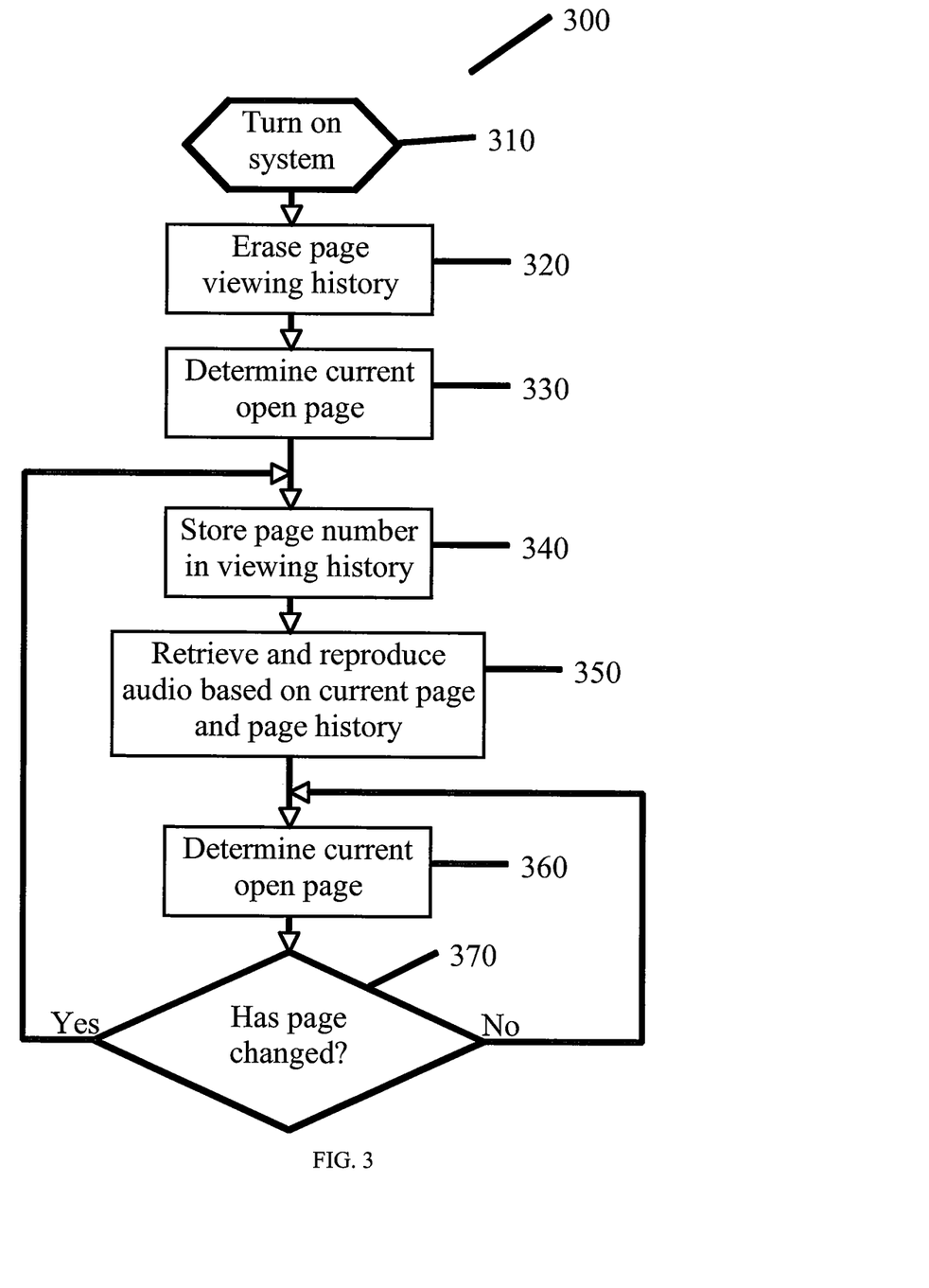
FIG. 3 depicts a flowchart for the operating sequence of the system of the present invention.

FIG. 3 depicts a flowchart of the operation sequence 300 by which the system of the present invention provides supplementary content to the user of the system. At a step 310 the system is turned on. At an optional step 320 the page viewing history stored in a second memory 40 is erased. The determination of whether step 320 is performed may be based on an external or internal input to the system 10, such as a switch provided with or monitored by a control unit 20. At a step 330 the system determines the identity of the current open page. This determination may be by means of an automatic sensor, or by manual action of the viewer. At a step 340 the current page number is stored in the page viewing history. At a further step 350 control unit 20 retrieves a segment of supplementary content from a first memory 30 and delivers said segment of supplementary content to output means 80. The choice of which of a plurality of segments of supplementary content is presented for the current page is based at least in part upon the stored viewing history. At further steps 360 and 370 the control unit determines when the current open page changes. When the current open page changes, the new page number is stored in the page viewing history at a step 340, and the cycle repeats until the system is turned off.

Figure 4:
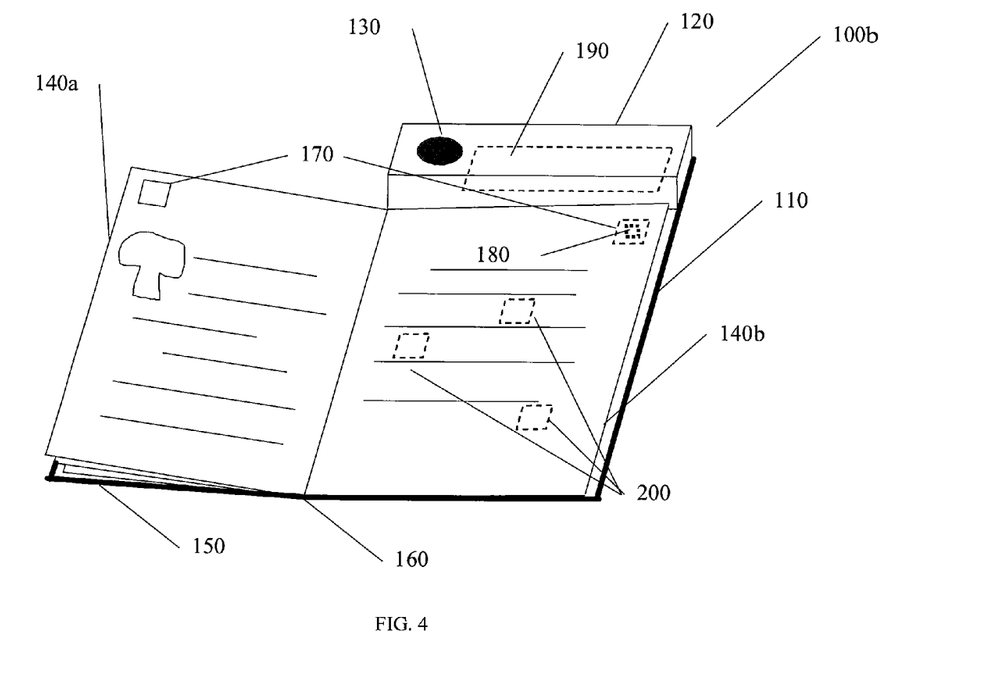
FIG. 4 depicts a second exemplary book system constructed according to the present invention.

FIG. 4 depicts an alternative embodiment of the present invention. Book system 100b incorporates the same components as described above in reference to FIG. 2. Additionally, book system 100b incorporates a plurality of position sensors 200 attached to back cover 110. Each of the plurality of position sensors 200 detects when the reader touches the open page in the corresponding position.

Figure 5:
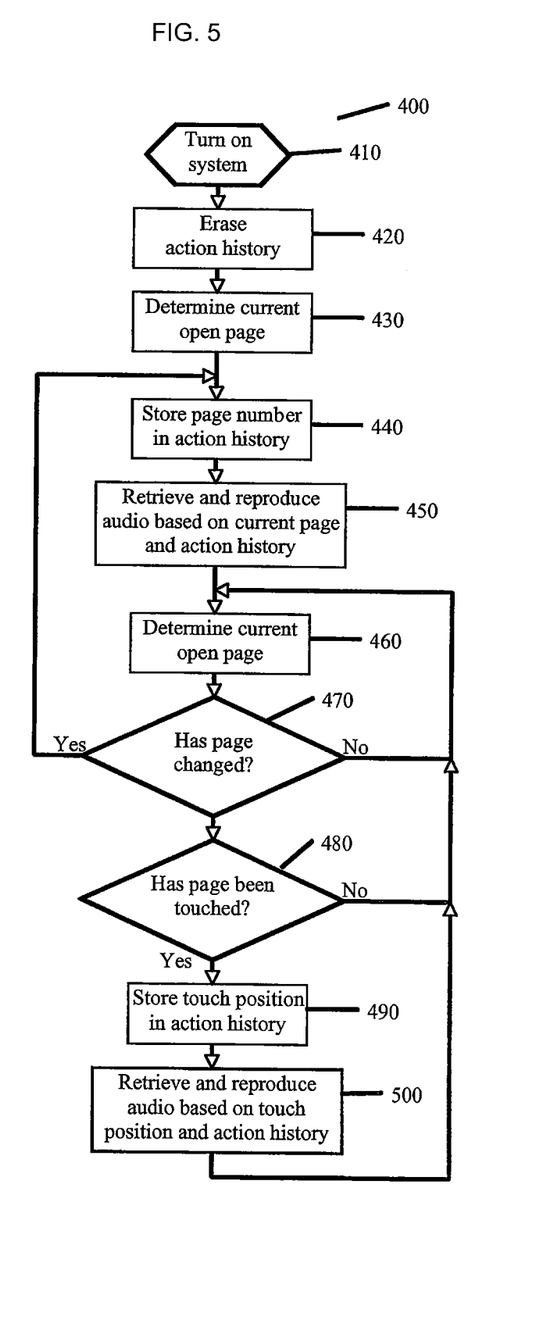
FIG. 5 depicts a flowchart for the operating sequence of the second exemplary system according to the present invention.

FIG. 5 depicts a flowchart of the operation sequence 400 by which the system of the alternative embodiment depicted in FIG. 4 provides supplementary content to the user of the system. At a step 410 the system is turned on. At an optional step 420 the action history stored in a second memory 40 is erased. The action history is the sequence of open pages and positions touched on those pages. The determination of whether step 420 is performed may be based on an external or internal input to the system 10, such as a switch provided with or monitored by control unit 20. At a step 430 the system determines the identity of the current open page. This determination may be by means of an automatic sensor, or by manual action of the viewer. At a step 440 the current page number is stored in the action history. At a further step 450 control unit 20 retrieves a segment of supplementary content from a first memory 30 and delivers said segment of supplementary content to output means 80. The choice of which of a plurality of segments of supplementary content is presented for the current page is based at least in part upon the stored action history. At further steps 460 and 470 control unit 20 determines if the current open page has changed. If the current open page has changed, the new page number is stored in the page viewing history at a step 440, and the cycle repeats. If the current page has not changed, at a further step 480 control unit 20 determines whether the page has been touched. If the page has been touched, at a step 490 the touch position is stored in the action history. At a step 500, control unit 20 retrieves a segment of supplementary content from a first memory 30 and delivers said segment of supplementary content to output means 80. The choice of which of a plurality of segments of supplementary content is presented for the current touch position is based at least in part upon the stored action history. After the supplementary content is presented, the system returns to a step 460 and the cycle repeats. If at a step 480 the page has not been touched, the system returns to a step 460. The cycle repeats until the system is turned off.

Figure 6:
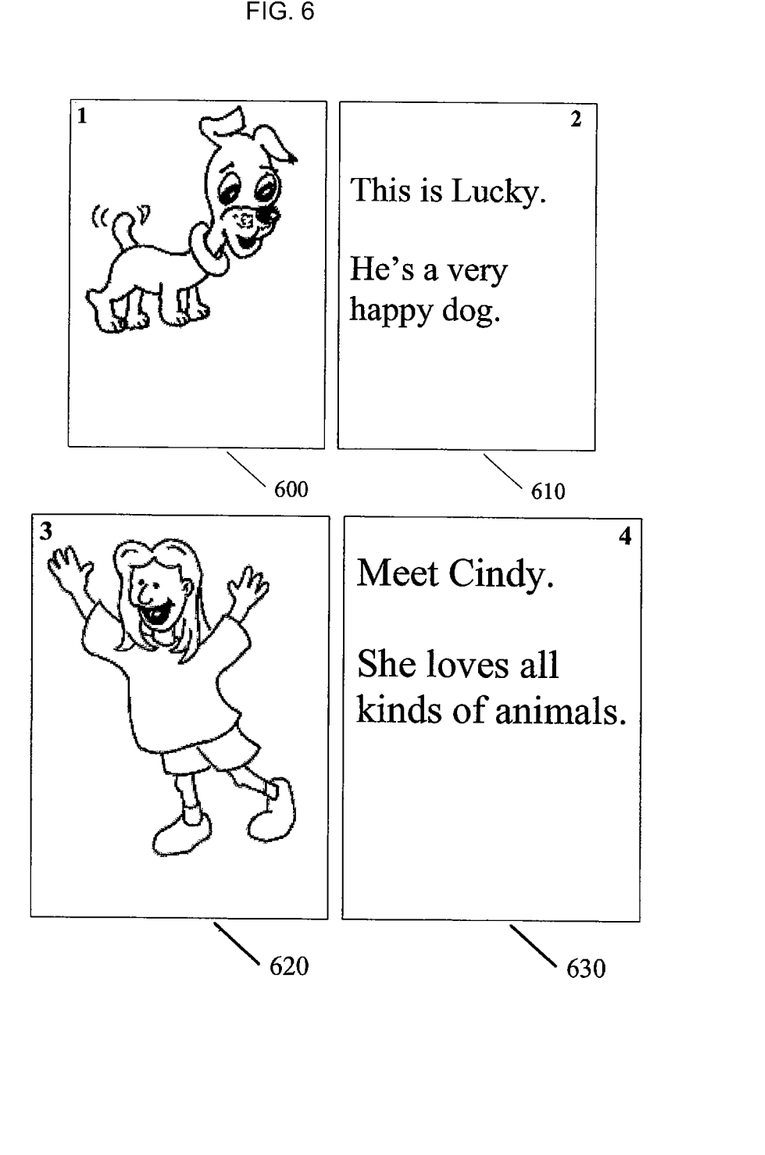
FIG. 6 shows an example set of pages from a book utilizing the present invention.

By way of illustrative example, FIG. 6 shows a set of four pages 600, 610, 620, 630 from a book configured to operate according to the present invention. For this set of pages, the supplementary content memory 30 contains a set of four compressed audio phrases, namely page 1, phrase 1—"Lucky likes to have his ears rubbed."
  page 1, phrase 2—"Lucky is Cindy's dog."
  page 3, phrase 1—"Cindy especially loves dogs."
  page 3, phrase 2—"Cindy plays with Lucky every day."

When the book is opened to the page 1 and the page viewing history is empty, the control unit selects page 1 phrase 1 "Lucky likes to have his ears rubbed" for presentation. Note that page 1 phrase 2 would be confusing to the reader at this point, since the reader has not yet viewed the page that depicts Cindy. If the reader next opens page 3, the control unit selects page 3 phrase 2 "Cindy plays with Lucky every day" for presentation, since the reader has already learned who Lucky is and the sentence will be understandable to the reader. If the reader next turns back to page 1, the control unit selects page 1 phrase 2 "Lucky is Cindy's dog" for presentation, since the reader has learned who Cindy is and that Cindy plays with Lucky. If the reader next turns back to page 3, the control unit selects page 3 phrase 1 "Cindy especially loves dogs" for presentation.

Now suppose instead that the reader first opened the book to page 3 and the page viewing history was empty. The control unit selects page 3 phrase 1 "Cindy especially loves dogs" for presentation, since in this case, at this point the reader does not know who Lucky is and the phrase "Lucky is Cindy's dog" would be confusing for the reader. If the reader next opens page 1, the control unit selects page 1 phrase 2 "Lucky is Cindy's dog" for presentation, since the reader has learned who Cindy is. If the reader next turns back to page 3, the control unit selects page 3 phrase 2 "Cindy plays with Lucky every day" for presentation, since the reader has already learned that Cindy loves dogs and that Lucky is Cindy's dog. If the reader next turns back to page 1, the control unit selects page 1 phrase 1 "Lucky likes to have his ears rubbed" for presentation.

By making use of the stored history of the reader's interaction with the printed content of the pages of the system in determining the presentation sequence, the control unit can present the supplementary content in a sequence that reduces confusion for the reader and adds educational and entertainment value to the experience of reading the printed content.

When this description uses the term "open page", one will recognize that a conventionally-bound open book presents two open page faces to the reader at any one time, namely a left-hand page face and a right-hand page face. For the purposes of this invention, in the preferred embodiment an automatic page sensor 60 does not distinguish between the left-hand and right-hand page when detecting which page is open to the reader. In an alternative embodiment utilizing a manually-activated page sensor 60, said manually-activated page sensor 60 might distinguish between the left-hand page face and the right-hand page face. Such variation is intended to fall within the spirit and scope of this description and the subsequent claims.

Similarly, in an alternative embodiment a book might be bound along any side of the pages, whether left, top, right or bottom. Such variation is intended to fall within the spirit and scope of this description and the subsequent claims.

Similarly, in an alternative embodiment that incorporates touch sensors, said touch sensors may be disposed beneath only the right-hand page, only the left-hand page, or both right-hand and left-hand pages. These alternatives are intended to fall within the spirit and scope of this description and the subsequent claims.

It should be apparent that the present invention provides an inexpensive and reliable book system for producing supplementary audio content based on the sequence of pages viewed by the reader, fully satisfying the aims and advantages set forth above. Although the invention has been described in conjunction with specific embodiments thereof, it is evident that many alternatives, modification and variations will be apparent to those skilled in the art. Accordingly, it is intended to embrace all such alternatives, modification and variations that fall within the spirit and broad scope of the appended claims.

I claim:

1. A system comprising:
  a plurality of pages, at least two or more of the plurality of pages containing printed content;
  a sensory means for determining which page of the plurality of pages is being viewed by a user;
  a first memory arranged for storing supplementary content related to printed content of at least one of the plurality of pages of containing printed content;
  a second memory arranged for recording the sequence of pages viewed by the user;
  an output means for presenting the supplementary content to the user;
  a control means capable of reading from the first memory, reading from and writing to the second memory, reading the output of the sensory means, and outputting supplementary content to the output means; and wherein the supplementary content output to the output means is selected, at least in part, based on an identity of a current page being viewed by the user and on the sequence of pages viewed by the user.

2. A system comprising:

a plurality of pages, at least two or more of the plurality of pages containing printed content;

a sensory means for determining which page of the plurality of pages is being viewed by a user;

a sensory means for detecting which of a plurality of locations on a page being viewed by the user is touched by the user;

a first memory arranged for storing supplementary content related to printed content of at least one of the plurality of pages of containing printed content;

a second memory arranged for recording a sequence of pages viewed by the user and for each of the sequence of pages viewed by the user, a sequence of locations on each of said pages touched by the user;

an output means for presenting the supplementary content to the user;

a control means capable of reading from the first memory, reading from and writing to the second memory, reading the output of the sensory means, and outputting supplementary content to the output means; and wherein the supplementary content output to the output means is dependent at least in part on an identity of a current page being viewed by the user, on the sequence of pages viewed by the user and on the sequence of locations on each of said pages touched by the user.

3. A system comprising:

a plurality of pages containing printed content;

a page sensor arranged for determining which page of the plurality of pages is being viewed by a user;

a first memory arranged for storing supplementary content related to printed content of at least one of the plurality of pages of containing printed content;

a second memory arranged for recording a sequence of pages viewed by the user; and a control unit arranged to select supplementary content based at least in part on an identity of a current page being viewed by the user and on the sequence of pages viewed by the user.

4. A system comprising:

a plurality of pages containing printed content;

a page sensor for determining which page of the plurality of pages is being viewed by a user;

a touch sensor arranged for detecting which of a plurality of locations on a page being viewed by the user is touched by the user;

a first memory arranged for storing supplementary content related to printed content of at least one of the plurality of pages of containing printed content;

a second memory arranged for recording a sequence of pages viewed by the user and for recording the sequence of locations on each of said pages touched by the user; and a control unit arranged for selecting supplementary content based at least in part on an identity of a current page being viewed by the user, on the sequence of pages viewed by the user, and on the sequence of locations on each of said pages touched by the user.

* * * * *